Sept. 1, 1931.  G. A. JENKINS  1,821,061
SEMIBUOYANT AIRCRAFT
Filed March 29, 1930   2 Sheets-Sheet 1
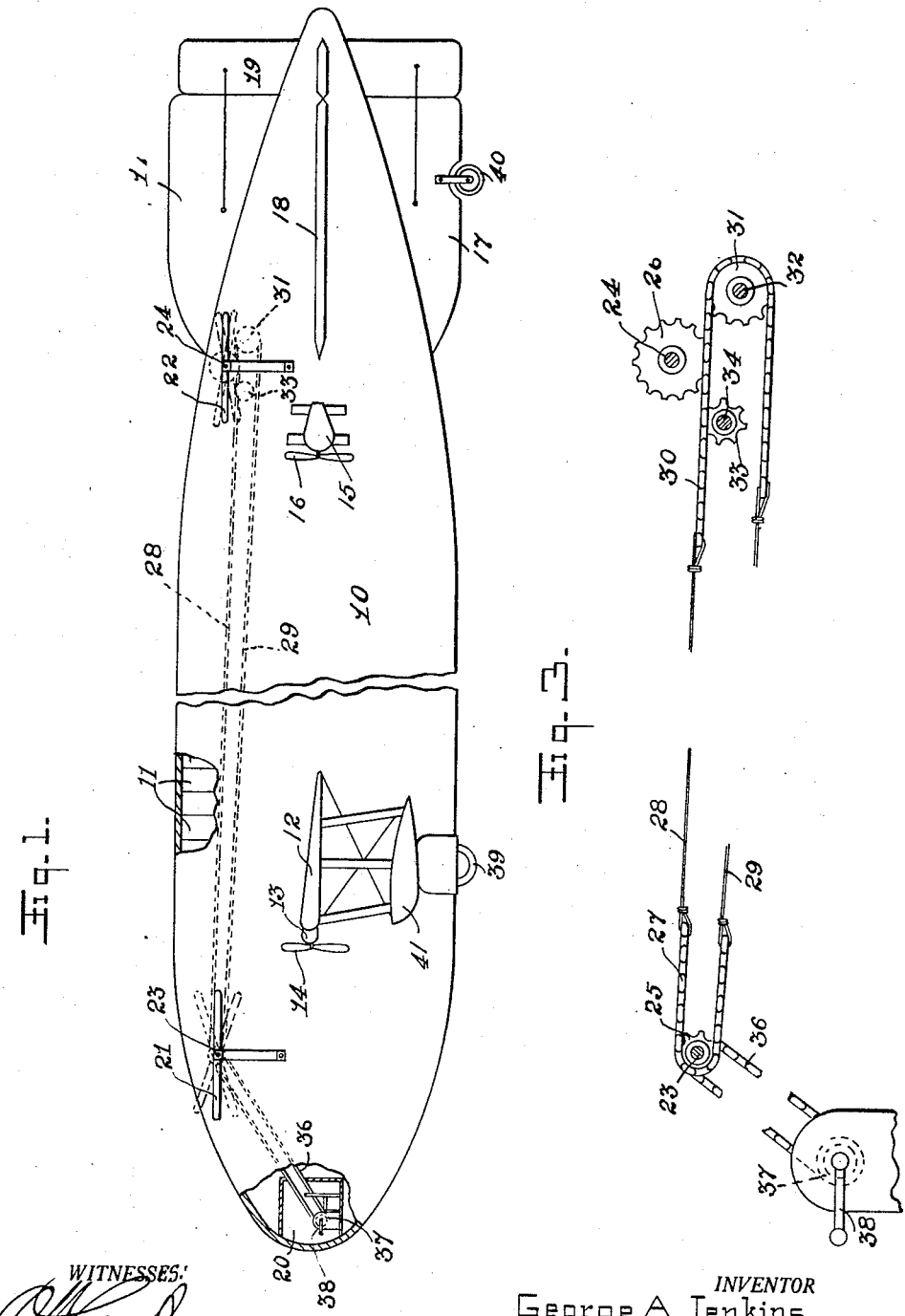
WITNESSES:
INVENTOR
George A. Jenkins
BY
ATTORNEY

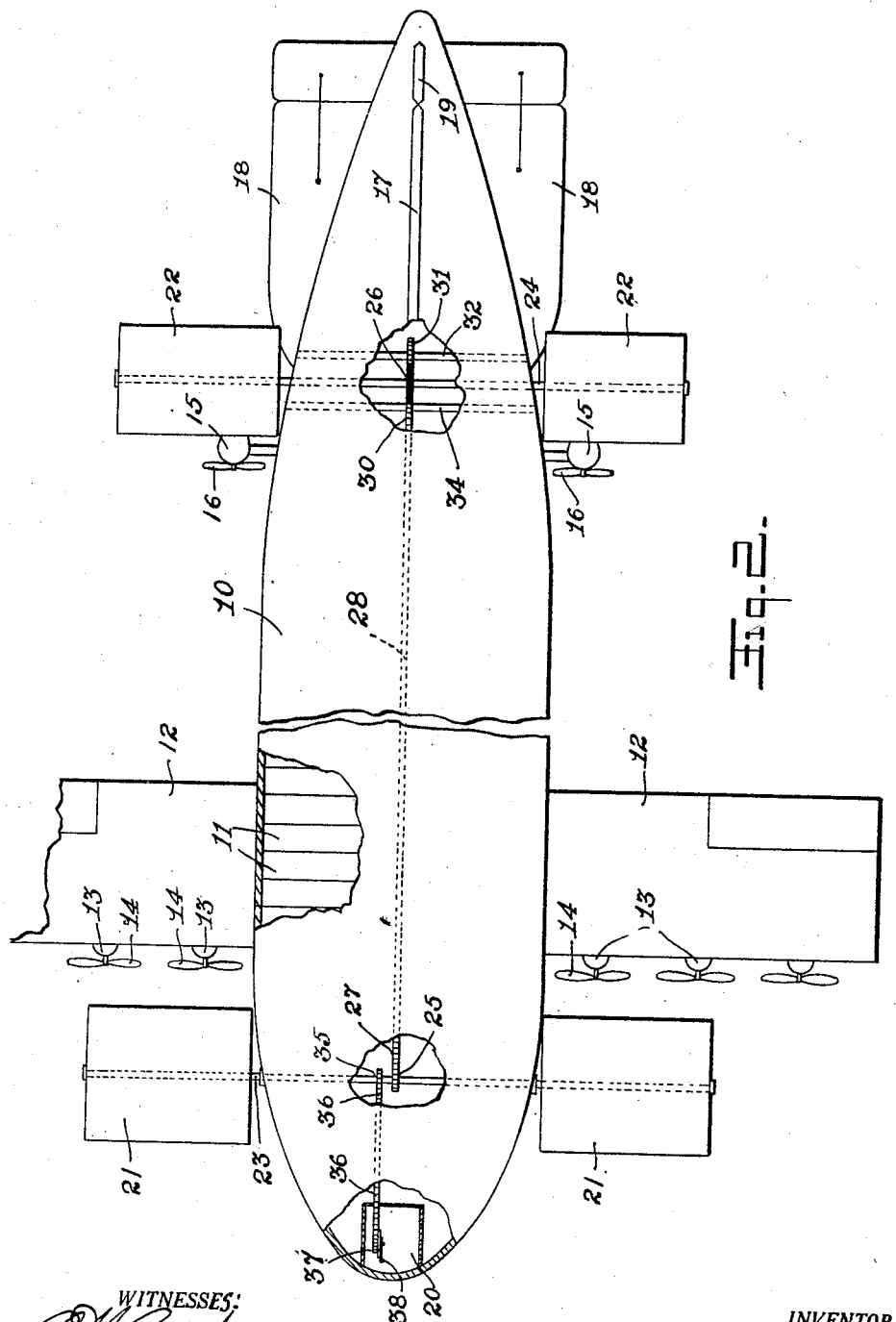

Patented Sept. 1, 1931

1,821,061

UNITED STATES PATENT OFFICE

GEORGE A. JENKINS, OF PHILADELPHIA, PENNSYLVANIA

SEMIBUOYANT AIRCRAFT

Application filed March 29, 1930. Serial No. 439,926.

This invention relates to semi-buoyant aircraft and has for an object to provide an aircraft, embodying buoyant chambers, or containers, in combination with the lifting and sustaining properties of wings, and with improved means for assisting in the landing and take-off of the craft.

A further object of the invention is to provide, in an aircraft, a body of sufficient size to contain the necessary buoyant chambers and provide capacity for utilitarian purposes, with wings fixed to the body and co-operating with the buoyancy of the chambers in lifting and sustaining the organization and at the same time to provide angularly adjustable fins, under the control of the operator, which shall be tiltable in synchronism for assisting in the landing and take-off of the craft.

A further object of the invention is to provide in an aircraft a body of sufficient capacity to contain buoyant chambers or containers sustaining by their lifting capacity a part of the load, other means being provided for co-operating with said buoyancy for lifting and sustaining the weight in flight with improved means for distributing the propelling power and improved means for controlling the landing and take-off of the craft.

With these and other objects in view, the invention includes certain novel features, elements, constructions, operations, functions and mechanical movements especially a body having inherent lifting properties, with mechanical assistance and synchronizing fins for assisting in landing and taking off of the craft.

In the drawings:—

Figure 1 is a view in side elevation of a body of conventional and approved shape embodying the present invention, Figure 2 is a top plan view of the craft, and Figure 3 is a detail side elevation of the mechanism for controlling the landing and take-off fins.

Like characters of reference indicate corresponding parts throughout the several views.

The improved aircraft, which forms the subject matter of this application, comprises a body 10. The body 10 may be of any form found desirable and is shown in the drawings as the shape approved under the present practice of aeronautics but such shape is not to be considered as any limitation upon the invention.

Properly located within any part of the body found desirable but preferably at or adjacent to the top are gas bags 11. The capacity of said gas bags in lifting power is less than the weight of the craft but by employing them a semi-buoyancy is provided, relieving the craft of a great amount of the weight which must be lifted and sustained by the mechanical means. The mechanical means comprise wings 12 extending laterally from the sides of the body and positioned at such point as experience will dictate as being necessary to the proper trimming of the craft. The position of these wings therefore, indicated as nearer the bow than the stern is not to be considered as limiting the invention as to placing the wings elsewhere for the proper trim, as may seem necessary.

Preferably also, the power plant will consist of a plurality of motors 13 located within the wing structure with the propellers 14 in advance of the wings. Other auxiliary motors 15, with propellers 16 will be located at other points in relation to the body as found necessary or desirable.

The craft is also provided with the usual fins 17 and 18 and rudder 19 and other paraphernalia at the stern for controlling the elevation and angular movement of the craft, in substantially the usual and ordinary manner, and no detail description of these parts is considered necessary.

At the bow, the body is provided with a control room or pilot house 20 with of course, the usual and ordinary controls which are not shown in the drawings, and which form no part of the present invention. From the pilot house however, control is provided which will be hereinafter more fully described in detail for the altitude fins 21 and 22. These fins 21 and 22 are mounted in normally horizontal planes extending laterally from the sides of the body and journaled to tilt upon horizontal axes and to assume various angles to a horizontal plane. This journaling may be by means of any usual mechanical and approved structure.

In the drawings a shaft 23 is shown for the fins 21 and a similar shaft 24 is shown for the fins 22. These shafts are here shown as extending transversely through the body with the fins themselves rigidly attached to the opposite ends of the same shaft, but such specific mechanical construction is not intended to limit the mounting of these fins for horizontal adjustment in any manner which may be found mechanically expedient.

For controlling the adjustment of these fins a power transmission is herein disclosed merely by way of showing an operative structure but without limitation. This device as thus shown for illustrative purposes, comprises a sprocket 25 upon the shaft 23 and a sprocket 26 upon the shaft 24. A sprocket chain 27 passes about the sprocket 23 and may be continued the length of the body but to eliminate weight, preferably is continued by cables 28 and 29 connected with a sprocket chain 30 which passes about an idler sprocket 31 journaled in any approved manner as upon the shaft 32. A second idler sprocket 33 is also journaled in any approved manner as upon the shaft 34 and together with the sprocket 31, tends to maintain the sprocket chain 30 in engagement with the lower segment of the sprocket 26. This arrangement causes oscillations of the shafts 23 and 24 in opposite directions as will be apparent from an inspection.

Connected also, in some manner, with the shaft 23 is a sprocket 35 with a sprocket chain 36 receiving motion from a sprocket 37 in the control room. It is obvious that this sprocket chain 36 may be continuous or constructed as indicated in regard to the sprocket chains 27 and 30 and the showing of the device as broken at Figure 3 indicates that it may be continued in any manner found expedient.

Any means for manual control of the sprocket 37 may be provided as exegencies or practice may suggest a crank arm 38 being here shown as merely indicative of the application of manual control.

The craft outlined as above, is intended to land either upon the ground or upon water. For landing upon the ground, landing wheels 39 are provided with a caster wheel 40 at the rear. It is obvious of course, that this caster wheel may be replaced by the ordinary skid without in any way departing from the invention. For water, pontoons 41 are provided to assist in buoying the craft and maintaining it against lateral tilting in the well known manner.

Assuming that the craft is about to take-off, either from the land or water, the altitude fins 21 and 22 are manually tilted to the broken line position, the connection being such that the tilting is synchronized but the fins are tilted in the opposite direction, that is to say, in taking off, the forward edge of the bow fins 21 is tilted upwardly while the forward end of the stern fins 22 is tilted downwardly. It will be noted however, that the amplitude is different in the two fins, the tilting being greater in the bow fins than in the stern fins. This is brought about in the manner hereinbefore explained by the difference in size between the sprockets 25 and 26. In flight, the position of the fins 21 and 22 will generally maintain horizontal positions but of course, for making an ascent, even in flight, the fins may be employed in the manner outlined for taking off. When a landing is to be made, the fins are tilted to the dotted lines shown at Figure 1. That is to say, with the forward end of the bow fin depressed, and the forward end of the stern fin raised, the amplitude being the same as before described. These fins may also be employed in flight when it is desired to reduce the altitude.

Of course, the semi-buoyant aircraft herein illustrated may be modified in various ways without departing from the invention herein set forth and hereinafter claimed.

The invention is hereby claimed as follows:

1. A semi-buoyant aircraft comprising a body having buoyant chambers, mechanical means for lifting and sustaining the weight in excess of the buoyant lift and fins adjacent the bow and stern simultaneously manually adjustable relative to the horizontal plane, in reverse directions and different amplitudes.

2. A semi-buoyant aircraft comprising a body including buoyant chambers, mechanical lifting and sustaining means supplementing the buoyancy of the chambers, fins positioned adjacent the bow and stern and normally occupying horizontal planes and manual means for simultaneously tilting the fins through different angular amplitudes.

3. A semi-buoyant aircraft comprising a body, buoyant chambers associated with the body, mechanical lifting and sustaining means supplementing the buoyancy, fins extending laterally from the body adjacent the bow and stern and normally occupying horizontal planes and manual means for simultaneously tilting said fins in opposite directions, through different arcs the while maintaining a fixed ratio of angular variation.

4. A semi-buoyant aircraft comprising a body, buoyant chambers associated with the body, mechanical lifting and sustaining means supplementing the buoyancy, fins extending laterally from the body adjacent the bow and stern and manual means for simultaneously tilting said fins to unequal angular adjustments, said means maintaining a definite ratio of inequality.

5. A semi-buoyant aircraft comprising a body, buoyant chambers associated with the body, mechanical lifting and sustaining means supplementing the buoyancy, fins extending laterally from the body adjacent the bow and stern and tiltable upon horizontal axes and manual means for tilting said fins simultaneously in opposite directions and with fixed ratio of unequal angular adjustments.

6. A semi-buoyant aircraft comprising a body, buoyant chambers associated with the body, mechanical lifting and sustaining means supplementing the buoyancy, fins extending laterally of the body adjacent the bow and stern and tiltable upon horizontal axes, and manual means for tilting said fins simultaneously in opposite directions, said means effecting the tilting of the bow fin through a greater arc than the stern fin.

In testimony whereof I have signed my name to this specification.

GEORGE A. JENKINS.